March 28, 1939.	E. FLADMARK	2,151,963
METHOD OF ELIMINATING FOAM AND FROTH FROM
THE SURFACES OF FLUIDS AND SEMIFLUIDS
Filed Nov. 12, 1934
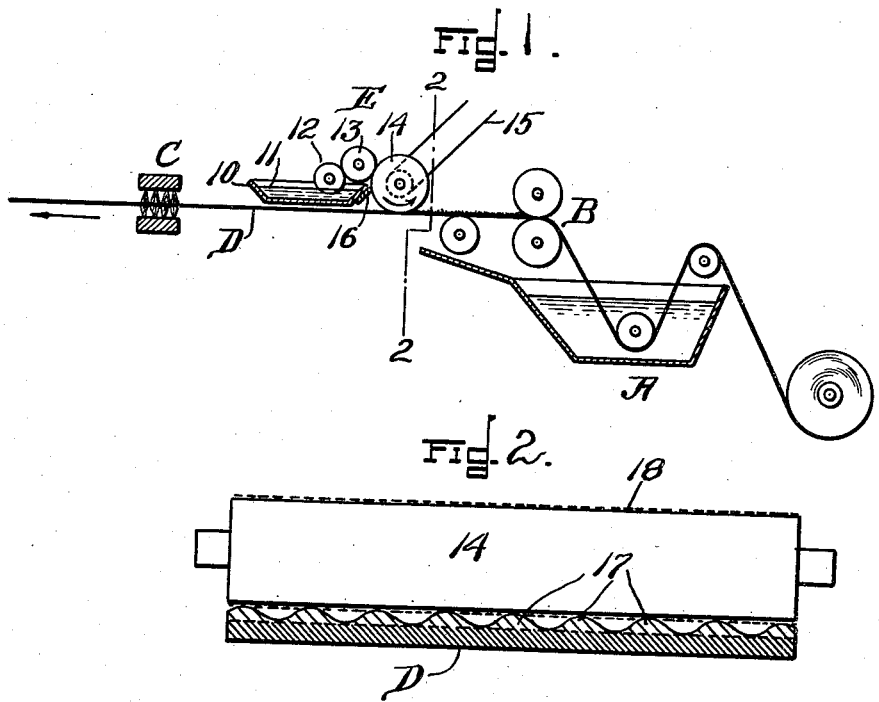
Inventor=
Erling Fladmark,
By Arthur F. Randall Patented Mar. 28, 1939

2,151,963

UNITED STATES PATENT OFFICE 2,151,963

METHOD OF ELIMINATING FOAM AND FROTH FROM THE SURFACES OF FLUIDS AND SEMIFLUIDS

Erling Fladmark, Lawrence, Mass.

Application November 12, 1934, Serial No. 752,692

6 Claims. (Cl. 91—68)

My invention relates to a process for removing foam, froth and the like from the surface of fluids and semi-fluid bodies.

The object of my invention is to provide an inexpensive and efficient defoaming or defrothing method by which defects in manufactured products, and also manufacturing difficulties, caused by the presence of foam or froth on the surface of fluids or semi-fluid bodies used in connection therewith, are obviated.

To these ends my invention contemplates an apparatus for and/or a method of continually or continuously supplying a defoaming or defrothing agent to the surface of a fluid or semi-fluid to change the surface tension thereof thereby to control or prevent foaming, or to remove foam therefrom.

In the accompanying drawing:

Figure 1 is a view, more or less diagrammatic, of a machine for coating a web or sheet material such as paper, said machine including mechanism constructed and operating in accordance with this invention, and said mechanism operating continuously to remove the foam from said web as the latter travels through said apparatus.

Figure 2 is a section on line 2—2 of Fig. 1, but with the thickness of the web and its coating greatly exaggerated for the purpose of illustration.

Foam is a dispersed mixture of gas and fluid in which the gas is the dispersed phase or element and the fluid the dispersing phase or element. Foam is therefore lighter than the fluid from which it is formed and tends to collect on the surface greatly increasing the apparent volume of the body of fluid. Whether the foam that is formed will have a disturbing effect on the particular manufacturing operation or process and the finished product or not depends on the stability of the foam that is formed, and it is therefore highly desirable and often essential to reduce the stability of the foam as much as possible.

Defoamers are usually liquid substances repellant to and lighter than the liquid which they defoam and function to defoam by collecting on the surface of the fluid in a thin film which changes the surface tension of the fluid, causing the surface to contract to such an extent that bubbles cannot exist upon the same. The thinnest film of defoamer that will perform this function is a uni-molecular film; that is, a film formed by single molecules of defoamer arranged side by side. To be effective this film should cover the entire surface to be defoamed. What small quantities are required here is shown in the article by F. Emslander and H. Freundlich, entitled "Surface influences in beer during manufacture", found in the German publication "Zeitschrift für Physicalische Chemie" of 1904, vol. 49, page 317, where it is stated that $3 \times 10^{-7}$ grams peptone is sufficient to cover a surface measuring one square centimeter with a solid film.

Supposing the defoamer molecule to be of approximately the same size as the peptone molecule it would cover the same surface, or one pound of defoamer would suffice to cover a surface of approximately two hundred and fifty million square inches. Therefore, if the defoamer is correctly chosen and correctly applied this amount should also effectively defoam a surface of the same size.

Defoamers have heretofore generally been mixed into the fluid to be defoamed and since the defoamer was lighter than the fluid and repellant to, or at least difficult to mix with, the fluid, it would rise to the surface and break or dissipate the foam there, but it would not always prevent further formation of foam at a later time or point in the process being carried out when it was practically impossible to mix additional defoamer into the fluid.

It is one of the objects of my invention to provide for defoaming a fluid, or semi-fluid, surface at a point or time in the process being carried out where it has not heretofore been practical or possible, or at least attempted so far as I know. A case in point is found in the process of coating paper and I will now describe my process and apparatus as adapted to defoaming coated papers during the process of manufacture.

One of the difficulties in making high-grade coated paper is the presence of pinholes or froth pits in the coating which are caused by minute bubbles of air or gas in the coating mixture. Many substances have heretofore been added to the coating mixture to reduce froth or bubbles, but although they were sometimes very effective, they were not always dependable.

The defoamer was generally mixed with the coating color in the color room and since the defoamer was lighter than and repellent to the fluid coating color, or at least reluctantly mixable with said fluid, said defoamer would rise to the surface and break the foam there but it would not always prevent additional formation of foam at the coating machine where it has heretofore been practically impossible to mix additional defoamer with the coating color.

Foaming of the color at the coating machine may be caused by air in the paper; air trapped during the passage of the paper through the color bath and between the squeeze rolls or for some other reason such as fermentation of the color. In either case this foam will appear as bubbles of air on the coated surface and will soon clog the brushes of the coating machine with froth, causing brush marks to appear on the coated surface in addition to the pinholes. It is therefore important and desirable that this foam be completely dissipated before the coated paper reaches the brushes. I propose to accomplish this by adding a new unit to the coating machine, viz., a defoaming unit, which is shown in Fig. 1 at E.

The usual coating machine at the present time may be divided at the wet end thereof into three distinct units each characterized by its function.

1. The color bath A, where the character of the coating is determined by the composition and consistency of the color.

2. The squeeze rolls B, where the amount of coating applied to the paper is regulated by the spacing of said rolls.

3. Reciprocating brushes C, or the smoothing rolls or bars sometimes employed in lieu thereof, which levels out and smooths or evens the coating.

The present practice of defoaming colors in the manufacture of papers is described by D. B. Bradner in U. S. Patent No. 1,826,726, wherein the use of pine oil for this purpose is referred to. There are also on the market numerous chemicals sold as defoamer agents but which are only known by their trade names.

When the color is foaming this last unit must also remove the foam, and the third unit referred to, whatever it be, is not adapted for this purpose and therefore I provide the fourth defoaming unit shown at E.

The defoamer unit E comprises a vessel 10 containing the defoamer material 11, which may be a fluid; a pick up roll 12 that is partly immersed in the defoamer fluid 11, an intermediate roll 13 and a transfer roll 14.

The defoamer that is picked up by roll 12 is transferred to the intermediate roll 13 and the latter transfers it to the periphery of the transfer roll or conveyer 14. The transfer or defoamer roll 14 contacts with the coating surface of the paper web D and deposits on it sufficient defoamer to clear said surface of foam. The transfer or defoamer roll 14 may be driven in any suitable manner, as by a belt 15 so as to rotate with or against the direction of travel of the paper web D. At the present time I believe the most effective direction is to have the roll 14 rotate against the direction of the paper travel as then any heavy froth that was not immediately flattened by contact with the defoamer film on the defoamer roll 14 would probably attach itself to said roll and be in that way removed from the coated surface.

A doctor bar wiper 16 may be associated with the defoamer or transfer roll 14 to remove any such froth before that part of the roll again comes into contact with the coated surface.

I have found in the laboratory that the best way to defoam a coated surface is to draw across it very lightly a strip of paper or some other object moistened with defoamer. In this way a practically invisible amount of defoamer may be uniformly transferred to the coated surface and the foam destroyed without removing any appreciable amount of the coating except the heavy foam which may attach itself to the paper. It is this same function that is intended for the defoamer roll 14.

As the coating leaves the squeeze rolls B it is possible to see the coating form into longitudinal ridges 17 on the paper as shown in Fig. 2.

The defoamer roll 14 will be correctly positioned relatively to the web D when the defoamer film 18 on the under side of the roll just contacts with the top of the ridges 17 on the coated surface without exerting any measurable pressure upon them. In this way only the minimum amount of defoamer needed will be transferred to the coated paper. If there is a heavy accumulation of foam the foam will form elevated spots on the coating and therefore come into closer contact with the defoamer film on roll 14 rubbing off more defoamer exactly where it is needed the most. If the foam is very heavy it may attach itself to the defoamer roll 14 and be bodily removed from the coated surface. The coated surface should therefore be perfectly clean after passing the defoamer roll 14 so that the brushes C can do their leveling or evening without interference from the foam.

In the brush type coater only are the three old units referred to above kept definitely separate. In other forms of coating machines such as the roll coater or the doctor roll coater, two or more of the functions are combined in one unit, but whatever form the coating machine takes I believe a defoaming unit such as that shown at E and described above will function to clean the surface of foam and always result in a smoother surface than it has heretofore been possible to secure.

The use of my invention in connection with the manufacture of paper as above described results in a coated paper product of improved printing qualities since the least traces of foam and air bubbles heretofore resulting in pinholes, brush marks and other defects, are removed, and it will be noted that the above described defoaming unit E is characterized by a continuously moving member which continuously receives upon it the defoaming material and by which the defoaming material is applied to the surface to be defoamed in a regulated fashion.

In carrying out my invention I may use any suitable defoamer appropriate to the fluid that is to be treated.

The defoamer unit above described is characterized by a traveling transfer element or conveyer by means of which the defoamer material is transferred from a reservoir or supply to a fluid that is to be treated, and I do not desire to be understood as limiting the invention to the specific transfer element or elements herein shown and described, since any suitable means may be substituted therefor to transfer the defoamer material from the supply to the fluid that is to be treated without departing from my invention.

The rolls 12 and 13 of Fig. 1 are preferably driven through suitable gearing from the shaft of the roll 14, or in any other suitable fashion.

What I claim is:

1. In paper making the method of defoaming a moving web of paper having a fluid coating film applied thereto which consists in utilizing the movement of said web to distribute a defoamer agent directly upon the surface of said film.

2. In paper making the method of defoaming a moving web of paper having a fluid coating film applied thereto which consists in utilizing the movement of said web to continually deposit a defoamer agent upon the surface of said coating film at a predetermined place of application so that the portion of said film that is moving beyond said place of application is devoid of foam.

3. In paper making the method of producing a web of paper having a coated surface free from foam and defects caused by foam which consists in moving said web so as to bring the coating of said surface lightly into contact with a moving surface carrying a uniformly distributed film of defoamer agent while said coating is in a fluid state.

4. The method of making a web of coated paper which consists in first applying a film of coating material to said web while it is in motion; then squeezing the coated web while it is in motion; then treating said coating to defoam the same while it is in motion with said web, and lastly evening the moving coating while it is in a fluid state and free from foam.

5. The method of making a web of coated paper which consists in first applying a film of coating material to said web while it is in motion; then squeezing the moving coated web; then utilizing the movement of said web to bring the coating lightly into contact with a defoamer agent, and lastly evening said coating.

6. The method of making a web of coated paper which consists in first applying a film of coating material to said web; then treating said coating to defoam the same, and lastly, evening the coating while it is in a fluid state and free from foam.

ERLING FLADMARK.